United States Patent
King et al.

(10) Patent No.: US 8,368,611 B2
(45) Date of Patent: Feb. 5, 2013

(54) ENCLOSED ANTENNA SYSTEM FOR RECEIVING BROADCASTS FROM MULTIPLE SOURCES

(75) Inventors: Lael King, Minneapolis, MN (US); James Boardson, Roseville, MN (US)

(73) Assignee: Electronic Controlled Systems, Inc., Bloomington, MN (US)

( * ) Notice: Subject to any disclaimer, the term of this patent is extended or adjusted under 35 U.S.C. 154(b) by 281 days.

(21) Appl. No.: 12/845,488

(22) Filed: Jul. 28, 2010

(65) Prior Publication Data

US 2011/0030015 A1 Feb. 3, 2011

Related U.S. Application Data

(60) Provisional application No. 61/230,694, filed on Aug. 1, 2009.

(51) Int. Cl.
| | |
|---|---|
| *H01Q 3/00* | (2006.01) |
| *H01Q 21/00* | (2006.01) |
| *H01Q 1/42* | (2006.01) |
| *H04N 7/20* | (2006.01) |

(52) U.S. Cl. ........ 343/872; 343/725; 343/766; 343/853; 725/63; 725/72; 725/73

(58) Field of Classification Search ............. 725/63, 725/72, 73; 343/725, 765, 766, 853, 872
See application file for complete search history.

(56) References Cited

U.S. PATENT DOCUMENTS

| | | | |
|---|---|---|---|
| 2,814,038 A | 11/1957 | Miller | |
| 3,071,338 A | 1/1963 | Kaufman et al. | |
| 3,388,401 A | 6/1968 | Weir | |
| 3,599,218 A | 8/1971 | Williamson et al. | |
| 3,781,898 A | 12/1973 | Holloway et al. | |
| 3,918,065 A | 11/1975 | Hutchison et al. | |
| 4,096,481 A | 6/1978 | Widmer et al. | |
| 4,190,839 A | 2/1980 | Liautaud | |
| 4,282,530 A | 8/1981 | Semplak | |
| 4,309,708 A | 1/1982 | Sayovitz | |
| 4,649,675 A | 3/1987 | Moldovan et al. | |
| 4,654,670 A | 3/1987 | Fleming | |

(Continued)

FOREIGN PATENT DOCUMENTS

| | | |
|---|---|---|
| FR | 2589633 A1 | 5/1987 |
| GB | 2 272 575 A | 5/1994 |

(Continued)

OTHER PUBLICATIONS

Search Report and Written Opinion for PCT/US2010/043928, dated Mar. 30, 2011, 9 pages.

(Continued)

*Primary Examiner* — Pankaj Kumar
*Assistant Examiner* — Randy Flynn
(74) *Attorney, Agent, or Firm* — Skaar Ulbrich Macari, P.A.

(57) ABSTRACT

The present disclosure is directed to enclosed antenna systems for receiving multiple different broadcast types. In one aspect of the disclosure, the enclosed antenna system comprises an enclosure including a satellite television antenna assembly, an off-air television antenna assembly and control electronics disposed on a motorized turntable. In another aspect, the off-air television antenna assembly comprises both UHF and VHF antenna assemblies. In a further aspect, the UHF and VHF television signals received by the off-air antenna assembly are combined, amplified and diplexed with the television signal received by the satellite television antenna assembly. A method of watching television broadcasts from satellite and off-air sources using a multi-antenna system contained within a single enclosure is also disclosed.

20 Claims, 7 Drawing Sheets

U.S. PATENT DOCUMENTS

| | | |
|---|---|---|
| 4,771,293 A | 9/1988 | Williams et al. |
| 4,868,575 A | 9/1989 | Mok et al. |
| 4,918,459 A | 4/1990 | De Teso |
| 4,939,524 A | 7/1990 | Blaese |
| 4,946,736 A | 8/1990 | Sassa |
| 4,998,114 A | 3/1991 | Eto et al. |
| 5,019,833 A | 5/1991 | Nonaka |
| 5,088,680 A | 2/1992 | Farmer |
| D333,470 S | 2/1993 | Vong |
| 5,218,369 A | 6/1993 | Jennings |
| 5,262,793 A | 11/1993 | Sperry |
| 5,274,382 A | 12/1993 | Wills et al. |
| 5,296,862 A | 3/1994 | Rodeffer et al. |
| 5,309,162 A | 5/1994 | Uematsu et al. |
| 5,337,062 A | 8/1994 | Sherwood et al. |
| 5,347,286 A | 9/1994 | Babitch |
| 5,418,542 A | 5/1995 | Sherwood et al. |
| 5,419,521 A | 5/1995 | Matthews |
| 5,451,972 A | 9/1995 | Franklin |
| 5,471,219 A | 11/1995 | Rodeffer et al. |
| D364,874 S | 12/1995 | Cheng |
| 5,515,065 A | 5/1996 | Sherwood et al. |
| 5,528,253 A | 6/1996 | Franklin |
| 5,543,814 A | 8/1996 | Jenness, Jr. |
| 5,585,804 A | 12/1996 | Rodeffer |
| 5,604,508 A | 2/1997 | Atkinson |
| 5,606,334 A | 2/1997 | Amarillas et al. |
| 5,610,620 A | 3/1997 | Stites et al. |
| 5,619,215 A | 4/1997 | Sydor |
| 5,646,638 A | 7/1997 | Winegard et al. |
| 5,675,348 A | 10/1997 | Okada et al. |
| 5,689,276 A | 11/1997 | Uematsu et al. |
| 5,714,963 A | 2/1998 | Cox |
| 5,729,241 A | 3/1998 | Ergen et al. |
| 5,760,751 A | 6/1998 | Gipson |
| 5,815,125 A | 9/1998 | Kelly et al. |
| 5,819,185 A | 10/1998 | Umezawa et al. |
| 5,877,730 A | 3/1999 | Foster |
| 5,892,488 A | 4/1999 | Dulon |
| 5,929,818 A | 7/1999 | Snyder |
| 5,933,123 A | 8/1999 | Kaul |
| 5,949,386 A | 9/1999 | Elliott |
| 5,983,071 A | 11/1999 | Gagnon et al. |
| 5,999,137 A | 12/1999 | Crosby |
| 6,002,374 A * | 12/1999 | Nicholas ............... 343/725 |
| 6,023,245 A | 2/2000 | Gomez et al. |
| 6,067,051 A | 5/2000 | Terk et al. |
| 6,072,440 A | 6/2000 | Bowman |
| 6,104,353 A | 8/2000 | Diamond et al. |
| 6,127,982 A | 10/2000 | Terk |
| 6,166,703 A | 12/2000 | Muterspaugh |
| 6,175,171 B1 | 1/2001 | Rupp et al. |
| 6,181,286 B1 | 1/2001 | Roscoe et al. |
| 6,188,367 B1 | 2/2001 | Morrison et al. |
| 6,191,752 B1 | 2/2001 | Lester et al. |
| 6,191,753 B1 | 2/2001 | Ellis et al. |
| 6,191,820 B1 | 2/2001 | Kang et al. |
| 6,204,820 B1 | 3/2001 | Jensen, Jr. |
| D440,961 S | 4/2001 | Inoue |
| D440,965 S | 4/2001 | Inoue |
| D442,167 S | 5/2001 | Emery |
| 6,266,017 B1 | 7/2001 | Aldous |
| 6,281,852 B1 | 8/2001 | Amarillas |
| 6,292,155 B1 | 9/2001 | McPhilmy et al. |
| 6,310,582 B1 * | 10/2001 | Uetake et al. ............... 343/765 |
| 6,329,954 B1 | 12/2001 | Fuchs et al. |
| 6,366,252 B1 | 4/2002 | Terk |
| D468,302 S | 1/2003 | Sato |
| D470,131 S | 2/2003 | Noro et al. |
| 6,519,446 B2 | 2/2003 | Tawil et al. |
| 6,538,612 B1 | 3/2003 | King |
| D480,712 S | 10/2003 | Noro |
| 6,682,029 B1 | 1/2004 | Dierkes |
| 6,693,587 B1 | 2/2004 | Kuether et al. |
| 6,710,749 B2 | 3/2004 | King |
| 6,710,794 B1 | 3/2004 | Yamazaki et al. |
| 6,714,167 B1 | 3/2004 | Gusick, Jr. |
| 6,762,727 B2 | 7/2004 | Rochford et al. |
| 6,844,855 B2 | 1/2005 | Carson |
| 6,864,846 B2 | 3/2005 | King |
| 6,937,199 B2 | 8/2005 | King |
| 7,227,506 B1 | 6/2007 | Lewis, Jr. |
| 7,230,581 B2 | 6/2007 | McEwan |
| 7,268,734 B2 | 9/2007 | Cislo |
| 7,317,366 B1 | 1/2008 | Duer |
| 7,372,428 B1 | 5/2008 | King |
| 7,477,203 B2 | 1/2009 | Park |
| 7,595,764 B2 | 9/2009 | Shuster et al. |
| 7,679,573 B2 | 3/2010 | Shuster et al. |
| 2004/0080461 A1 | 4/2004 | Rothgeb et al. |
| 2005/0225495 A1 | 10/2005 | King |
| 2006/0017638 A1 * | 1/2006 | Guidon et al. ............... 343/757 |
| 2007/0007402 A1 | 1/2007 | Dierkes |
| 2007/0216573 A1 * | 9/2007 | Handermann et al. ..... 342/357.1 |
| 2007/0216592 A1 | 9/2007 | Park |
| 2007/0252765 A1 | 11/2007 | Jayasuriya et al. |
| 2008/0136722 A1 | 6/2008 | King |
| 2008/0186242 A1 * | 8/2008 | Shuster et al. ............... 343/762 |
| 2009/0040130 A1 | 2/2009 | Conrad |
| 2009/0085825 A1 | 4/2009 | Conrad |
| 2009/0085826 A1 | 4/2009 | Conrad |
| 2009/0262033 A1 | 10/2009 | King et al. |
| 2010/0177001 A1 * | 7/2010 | Brisebois et al. ............ 343/763 |
| 2010/0207834 A1 * | 8/2010 | Wahlberg et al. ............ 343/763 |
| 2011/0006965 A1 * | 1/2011 | Kits Van Heyningen ..... 343/872 |

FOREIGN PATENT DOCUMENTS

| | | |
|---|---|---|
| JP | 11346168 A | 12/1999 |
| JP | 2005-203978 A | 7/2005 |
| WO | WO 02/103841 A1 | 12/2002 |
| WO | WO 2007067016 A1 * | 6/2007 |
| WO | WO 2008-030041 A1 | 3/2008 |
| WO | WO 2008/098121 A1 | 8/2008 |
| WO | WO 2009-061014 A1 | 5/2009 |

OTHER PUBLICATIONS

KVH Industries, Inc., A Guide to TracVision LM, 1999, 49 pages.

KVH Industries, Inc., A Guide to TracVision L3/53—Owner's Manual, 2003, 77 pages.

KVH Industries, Inc., A Guide to TracVision G4—Owner's Manual, 1999, 133 pages.

KVH Industries, Inc., A Guide to TracVision R4/R5—Owner's Manual, 2005, 66 pages.

KVH Industries, Inc., TracVision 45 manual, 1998, 47 pages.

Datron/Transco Inc. brochure, Product Information sheet for DBS-3000 Mobile Satellite Television System, Dec. 1996, 2 pages.

Datron/Transco Inc. Installation Instructions for DBS-30500 Mobile Satellite Television System, 1999, 23 pages.

Datron/Transco Inc., News Release dated Jul. 17, 1996 with information sheet for DBS-4000 In-Motionj Satellite System, 3 pages.

Datron/Transco Inc. Installation Instructions for DBS-4000-100 In-Motion Satellite Television System, 1996, 24 pages.

Datron/Transco Inc. product Information sheet for DBS-4000 In-Motion Digital Satellite Television Reception System, undated, 2 pages.

Sea Tel Inc., Operation and Installation Manual for Sea Tel Model 1898 Shipboard Satellite TV System, Oct. 2001, 51 pages.

Sea Tel Inc., Installation and Operation Manual for Sea Tel Model 2094 Shipboard Satellite TV Receive-Only System, May 1996, 81 pages.

Sea Tel Inc., Installation and Operation Manual for Sea Tel Model Coastal 18 Satellite TV Receive-Only Antenna with Motorized Polarization, Feb. 23, 2006, 88 pages.

King Controls Brochure for King Dome Automatic Satellite System, 1998, 2 pages.

King Controls, Installation and Operating Instructions manual for 9702 and 9702L-LP Automatic Satellite System, undated, 18 pages.

King Dome Satellite Locator System product informaiton, Mar. 5, 1999, 47 pages.

Telemetry & Communications Systems, Inc. "Model 600 Transportable Antenna System," various product information, Apr. 2001 and as indicated, 10 pages.

SkyTerra, "MSATG2 Mobile Satellite Radio User Guide," Rev. B, 2005, 44 pages.
Mobile Satellite Ventures, "MSATG2 Mobile Satellite Radio Installation Guide," no date indicated, 31 pages.
TracStar Systems, "SV360 Installation and Operations Manual," Digital Video Broadcasting, 2005, 66 pages.
SAT-GO Owners Manual, DIRECTV, Inc., 2007, 65 pages.
KVH TracVision M3 literature, KVH Industries, Inc., 2005, 6 pages.
Dr. Frank Baylin, excerpts from Digital Satellite TV, Baylin Publications, Boulder CO, 1997, 11 pages.
Samuel Silver, excerpts from Microwave Antenna Theory and Design, Boston Technical Lithographers, Inc., Lexington, MA, 1963, 10 pages.
Internet printout of http://www.naval.com/414-ldis.htm regarding the PR-414 Marine TV Antenna, printout dated Apr. 29, 2009, 2 pages.
Harold Pender, Penders's Handbook for Electrical Engineers, 1949, 2 pages (6-78 and 6-79), John Wiley & Sons, Inc., United States, 2 pages.
Winegard Co., Installation/Operation manual for RoadTrip LP1000 Satellite System, Jul. 20, 2004, 20 pages.
Winegard Co., manual for Movin View Digital Satellite Mobile Antenna for Two Receivers Model MV3500A, May 2005, 12 pages.
Telemetry & Communications Systems, Inc. "Model 600 Portable Antenna System" brochure, Sep. 2003, 2 pages.

\* cited by examiner

ENCLOSED ANTENNA SYSTEM FOR RECEIVING BROADCASTS FROM MULTIPLE SOURCES

PRIORITY

This application claims benefit of U.S. Provisional Patent Application Ser. No. 61/230,694, filed Aug. 1, 2009, which is hereby incorporated herein by reference in its entirety.

FIELD

The present invention generally relates to mobile motorized antenna systems. More particularly, the present invention relates to an enclosure having multiple antennas disposed inside that are each configured to receive broadcast signals corresponding to different broadcast types.

BACKGROUND

There are many different types of signals broadcast or transmitted to convey media, data or information. Common examples include television, radio, wireless internet and mobile phones. Some of these example broadcast signal types can be transmitted in multiple different ways or methods. For example, television and radio signals may be transmitted via earth-based transmitters (off-air), by satellite-based transmitters, or by physical wires (cable and fiber optic). Sometimes a combination of these ways are used.

Each type of signal and method of transmission usually requires a corresponding antenna configured to receive the media, data or information. For example, antennas for receiving satellite television broadcast signals are configured differently than antennas used to receive off-air television broadcasts. And each one cannot viably receive the other's signal. Therefore in this example, if a user desires to receive satellite television and off-air television broadcasts, the user must utilize multiple different antennas. The user must utilize two or more different and separate antennas because the antenna used to receive satellite television broadcasts cannot viably receive off-air broadcast signals, and vice-versa.

With the implementation of digital television signals, there has been a proliferation of local programming available via off-air transmissions. Usually not all of the off-air local programming is available via satellite transmission. And most of the programming available via satellite broadcast is not available via off-air reception. Therefore, some persons have both off-air and satellite antennas on their houses. Moreover, some attempts have been made to combine an off-air antenna with a satellite antenna. For example, U.S. Pat. Nos. 5,604,508, 5,606,334, Re 36,863 and 5,933,123 each disclose an off-air antenna combined with a satellite antenna dish that would be mounted on the roof of a house. However, these configurations are not suitable for use in a mobile environment. Indeed, the above-noted systems are open to the environment so they do not need to fit within any particular packaging requirements.

Components of antenna systems for mobile environments are typically housed within enclosures to protect against the elements. See, for example, U.S. Pat. Nos. 6,864,846 and 7,301,505, which are hereby incorporated by reference as part of the present application. It is desired to minimize the enclosure height because these types of systems are typically mounted on the roof of a vehicle, such as an RV. Manually transportable antenna systems are also known. See, for example, U.S. Pat. No. 7,595,764, which is hereby incorporated by reference as part of the present application. None of these systems includes an antenna for receiving off-air television broadcasts.

Therefore, a person desiring to receive both satellite television broadcasts and off-air television broadcasts in mobile environments, such as an RV, must use two separate antenna systems; one each for receiving each type of broadcast. Therefore, in addition to the mobile satellite antenna systems described above, the RV would also be fitted with one or more dedicated off-air television antennas on its roof. One example of this type of off-air antenna for RVs is disclosed in U.S. Pat. No. 5,262,793. Each antenna consumes limited roof space and also must be connected with a separate cable system. Therefore, cost and complexity is increased and flexibility of the RV configuration is decreased. Adding antennas for other types of broadcast signals compound these drawbacks. It would also be difficult to carry or move multiple separate antennas from one location to another. Therefore, there is a need for an enclosed antenna system that combines multiple different antennas within an overall package size that facilitates use in mobile applications.

SUMMARY

The present invention addresses certain deficiencies discussed above by providing for a device and system having multiple different antennas within a single enclosure. Several of the various aspects of the invention are directed to enclosed antenna systems for receiving multiple different broadcast types.

In one aspect of the disclosure, the enclosed antenna system comprises an enclosure including a satellite television antenna assembly, an off-air television antenna assembly and control electronics disposed on a motorized turntable. In another aspect, the off-air television antenna assembly comprises both UHF and VHF antenna assemblies. In a further aspect, the UHF and VHF television signals received by the off-air antenna assembly are combined, amplified and diplexed with the television signal received by the satellite television antenna assembly. A method of watching television broadcasts from satellite and off-air sources using a multi-antenna system contained within a single enclosure is also disclosed.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

Figure 1:
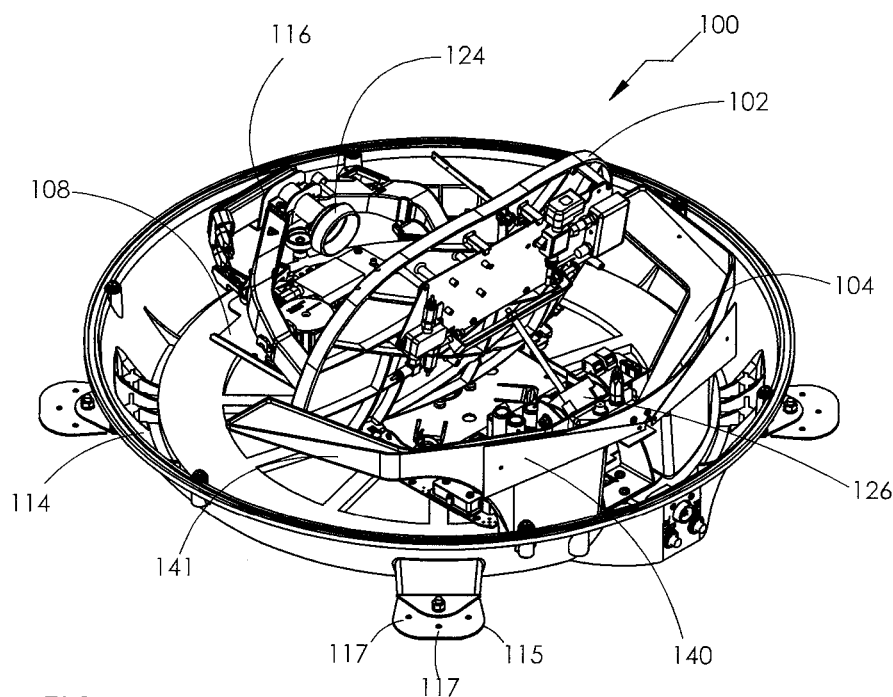
FIG. 1 is a perspective view of an enclosed multi-antenna system with the cover removed, according to an example embodiment.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various example embodiments; nevertheless, these embodiments are not intended to limit the present invention to any specific example, environment, application, or particular implementation described herein. Therefore, descriptions of these example embodiments are only provided for purpose of illustration rather than to limit the present invention.

Referring to FIGS. 1-6, an enclosed multi-antenna system 100 is shown. A satellite television antenna assembly 102, an off-air television antenna assembly 104 and control electronics 106 for controlling operation of the system are disposed on a turntable 108 located inside of an enclosure 110. The antenna assemblies 102 and 104 are maintained in the enclosure 110 in a fully deployed state so that it is not necessary to physically assemble or deploy the antenna assemblies before use, or fold up or retract the antenna assemblies after use or for transport.

The enclosure 110 protects the electronics and other components inside of the enclosure 110 from debris and contamination, such as dirt and water. The enclosure also provides for improved aerodynamics when traveling at speed or when subjected to wind. Thus, wind or air current will not affect the aiming of the antennas.

It is understood that various types of antenna assemblies, for example, satellite television, off-air (terrestrial broadcast) television, wireless internet, mobile phone, satellite radio and off-air radio, may be included in the multi-antenna system without departing from the scope of the invention. Moreover, different combinations of antenna assemblies may be disposed within the enclosure, and this combination may or may not include a satellite or off-air television antenna.

The enclosure 110 comprises a dome 112 mounted on a base 114. The dome 112 is a lightweight, ultraviolet light-protected, dielectric, plastic semi-hemispherical cover. The base may be made from the same material or a different material, for example, aluminum. The dome 112 and base 114 together enclose the antenna assemblies, control electronics and turntable. The dome 112 has an inner semi-hemispherical surface located in close proximity, for example within 2 centimeters, to the signal converter 116 of the satellite antenna assembly 102 so as to maximize reception and improve signal strength and quickly shed rain. However, alternative dome shapes, for example faceted, wedge, diamond and thimble-shaped, are included within the scope of the invention. Wedge, diamond and faceted shapes may be desirable for their aerodynamic properties when fastened to the roof of an RV. External electronics and power sources communicate with the respective components inside the enclosure 110 through connectors 118 provided at an interface portion 120 of the enclosure 110. The interface may also include a power connector 156 for connecting the device to an external power source, for example, a vehicle's 12 volt electrical system.

The dome 112 or base 114 of the enclosure 110 may be provided with a handle to facilitate carrying of the antenna system if the system is configured to be manually transported. The handle may be molded as part of either the cover or the base. A separate handle may also be provided that is bolted to the enclosure. More than one handle can be provided as well.

The base may have various configurations of feet or bottom protrusions to facilitate mounting to suitable brackets or mounting points on a vehicle. As shown in FIG. 1, a generally planar foot extension 115 is shown. The foot 115 is bolted to an extension of the base 114 and has a plurality of receiving holes or apertures 117 to allow the feet 115 to be fastened to, for example, the roof of an RV using conventional fastening means, such as bolts. The feet 115 are aluminum, however various materials may be used. In one additional example, the aluminum feet may have rubber bottoms applied so that the device can resist skidding when set on the ground or on a table. Additional bracket and feet configurations may be used as disclosed in U.S. Patent Application Pub. No. 2009/0262033 A1, the disclosure of which is hereby incorporated by reference herein.

The turntable 108 inside of the enclosure 110 permits the antenna assemblies 102 and 104 to rotate through one or more revolutions. A rotary joint 121 may be used to eliminate binding, and subsequent unwinding operations, of the cable connecting the antenna assemblies to the system output interface 120. Example rotary joints are disclosed in U.S. Pat. Nos. 6,188,367 and 7,372,428, the disclosures of both are hereby incorporated by reference in their entirety as part of this application. However, a cable-wrap system can be used.

The satellite antenna assembly 102 includes a parabolic reflector antenna dish 122, feedhorn 124, and signal converter or low noise block (LNB) 116 mounted on the turntable 108, which supports electronic controls 106 as well as elevation motor 126 and azimuth motor 128. The dish 122 in one embodiment has a truncated lower edge 130 created by removing a portion of dish so that lower edge 130 is substantially parallel to base 114. As a result of eliminating a lower portion of the parabolic dish 122, the enclosure 110 has a lower vertical profile than a parabolic dish of the same diameter. However, dishes of varying shapes, including circular, are included within the scope of the invention.

In one embodiment, the feed horn 124 and signal converter 116 are located on a support 132 on the front side of the dish 122. The feed horn 124 is located near or adjacent the focal point of the dish 122 and collects incoming signals. The support 132 is a generally horseshoe-shaped structure with the ends fastened to the dish 122 or dish support structure.

Incoming satellite television signals are reflected by the dish 122 to a focal point in front of the dish. The focal point location is determined by the geometry of the particular dish employed. The focused reflected signals are then collected by the feed horn 124 and sensed by the signal converter 116 that is in operable communication with the feed horn 124. The signal converter 116 amplifies the signals and converts them from microwaves to low frequency signals transmitted through coaxial cable to the enclosure input/output interface 120. A single feed horn 124 and signal converter 116 are shown in the figures. However, embodiments having multiple feed horns and multiple signal converters or a multiplexed signal converter within the enclosure 110 are included within the scope of the invention.

One or more cables (not shown), such as coaxial cables, attach to the signal converter or LNB and pass through the rotary joint (if used) and connect to the internal portion of the interface of the enclosure. External cabling can be connected to the external portion of the interface for connections to, for example, set top boxes, televisions, or integrated receiver decoder devices. Suitable fittings are provided to the interface to facilitate the various connections.

In another example embodiment, the signal converter 116 may be located on the back side of the dish 122. A reflector, or splash plate is located adjacent the focal point so that the focused signal is channeled through a tube to the signal converter operably located on the back side of the dish. It is understood that further alternative satellite antenna configurations are contemplated as being within the scope of the invention, including Cassegrain antenna configurations.

The dish 122 may comprise many different types of material, including metals and plastics. In one embodiment, the dish 122 is formed of plastic by, for example, vacuum forming or injection molding. Then the plastic dish 122 is metalized by coating it with aluminum or other conductive metal or alloy having a high reflectivity of the wavelengths used for broadcasting satellite television signals. Currently both Ka and Ku bands are used by satellite television service providers, but the invention is not limited to specific bandwidths. The dish 122 may be coated to reduce undesirable sun reflection (if the cover is removed) and to protect the metal coating of the dish. One or more lips and/or ribs 134 extending from the rear surface of the dish 122 may also be provided. These ribs 134 add structural support and provide connecting points for various components.

Figure 4:
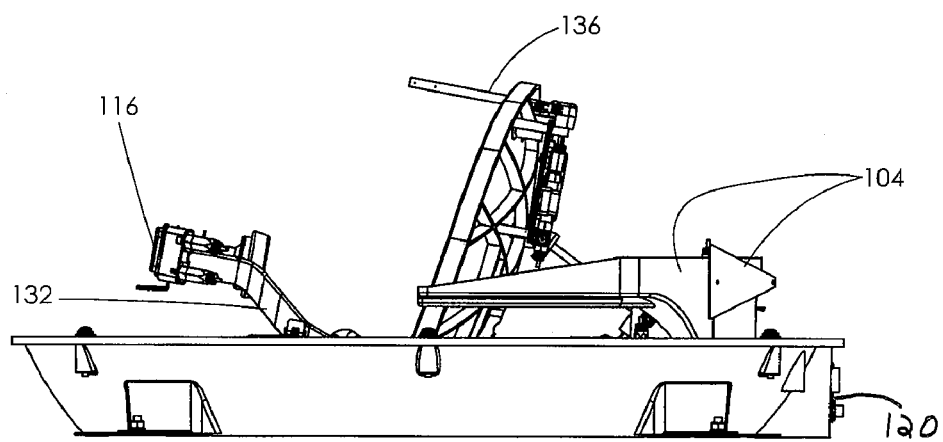
FIG. 4 is a side view of an enclosed multi-antenna system with the cover removed according to an example embodiment.
Figure 5:
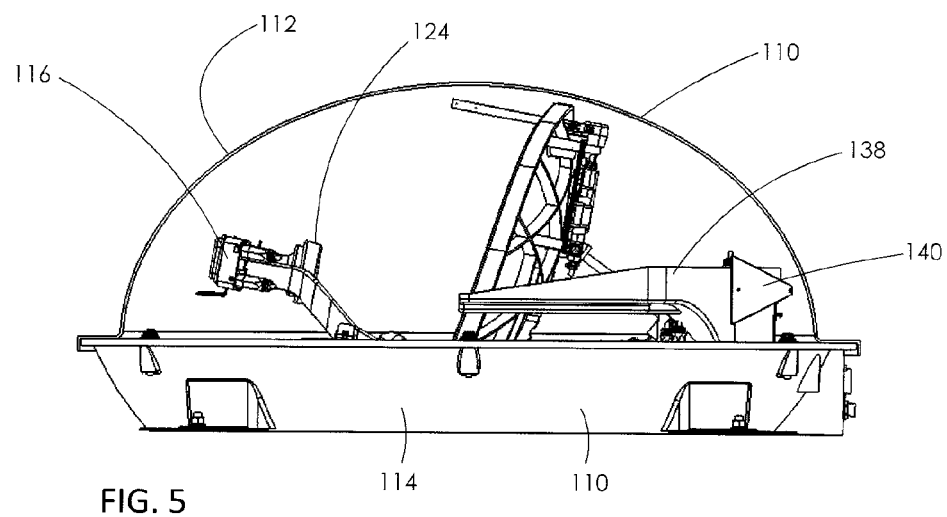
FIG. 5 is a side view of an enclosed multi-antenna system with a portion of the cover cut away, according to an example embodiment.
Figure 6:
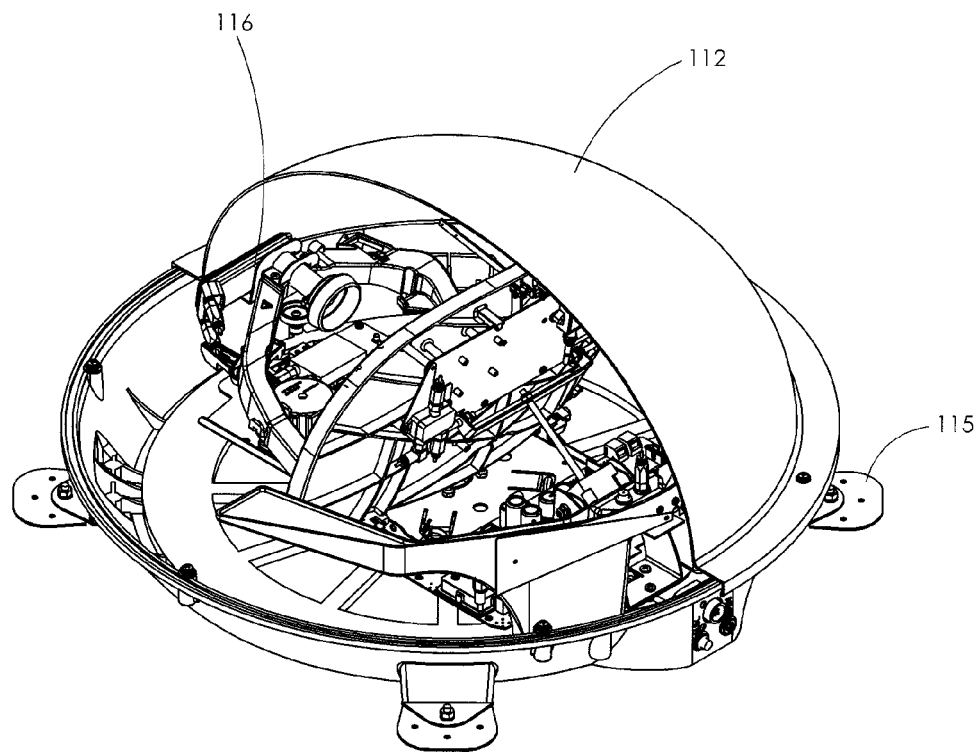
FIG. 6 is a perspective view of an enclosed multi-antenna system with a portion of the cover cut away, according to an example embodiment.

Azimuth positioning of the dish 122 and the off-air antenna assembly 104 is controlled by a gear selectively driven by an azimuth motor 128. Elevation of the dish 122 is selectively controlled by a tilt system comprising pivot pins mounted to the turntable 108 and a tilt or elevation motor 126 coupled to the rear of the dish 122. The azimuth position may be determined by a potentiometer whose shaft is axially linked to the axis of rotation of the antenna assemblies 102 and 104, limit switches or stepper motor counts. The tilt position may be determined by limit switches, tilt sensor feedback and stepper motor counts. A magnetic comparator compass 136 may be provided to the system to provide an azimuth directional reference. The comparator compass 136 may be disposed near the top of the dish and extend outwardly therefrom as shown in FIG. 4.

Alternatively, the azimuth and tilt positions may be calculated by the system 100 using a system location reference, such as GPS coordinates, and an aiming reference, such as a predetermined satellite broadcast location in the sky, or a compass. For example the GPS coordinates tell the system 100 where it is physically located on a map. Then knowing that the satellite antenna is pointed at a certain geostationary satellite broadcast location in the sky, for example the DirecTV 101° slot, the system can calculate the respective locations of other predetermined geostationary satellite television broadcast locations in the sky. That calculated information can be used for a variety of operations. For example, the system can quickly jump to another satellite location to receive additional programming without incurring the time required to perform a search for the desired target satellite location.

An internal electronic leveler sensor that automatically adjusts the tilt angle of the satellite dish for uneven ground conditions may also be provided to the antenna system. In one example embodiment, the sensor may be disposed on a sensor bracket attached to the molded ribs at the rear face of the dish. The electronic leveler sensor, for example, provides leveling information to the control electronics to permit the antenna assemblies to maintain a consistent elevation position if the turntable is not in the horizontal plane. For example, when the host vehicle is parked or portable antenna is placed on the side of an incline, the satellite dish will also be disposed at an incline. Thus the elevation of the satellite dish must be continuously adjusted during rotation in order to maintain a level track at the set elevation. The leveler system is integrated with an elevation tilt angle algorithm. The angle information provided by the level sensor also can be used as an anti-theft sensor by sensing sudden changes in orientation of the system that might indicate the system being removed from a mount by a thief. In such arrangement, an alarm is also coupled to the system.

The off-air antenna assembly 104 is configured to fit inside of the enclosure 110 and receive off-air television signals of a viable strength. Typical off-air television signals are broadcast on the UHF and VHF frequency bands. However, the invention is not limited to only these bandwidths. There are many different possible embodiments of suitable off-air antennas. A suitable off-air antenna fits within the enclosure and receives a viable off-air television signal. It also does not interfere with the viability of satellite television signal reception by the satellite antenna assembly, or at least can be moved within the enclosure to a position that will not compromise the variability of satellite television reception. A viable television signal is one that is sufficiently strong to permit a viewable picture by the user on a television.

Figure 2:
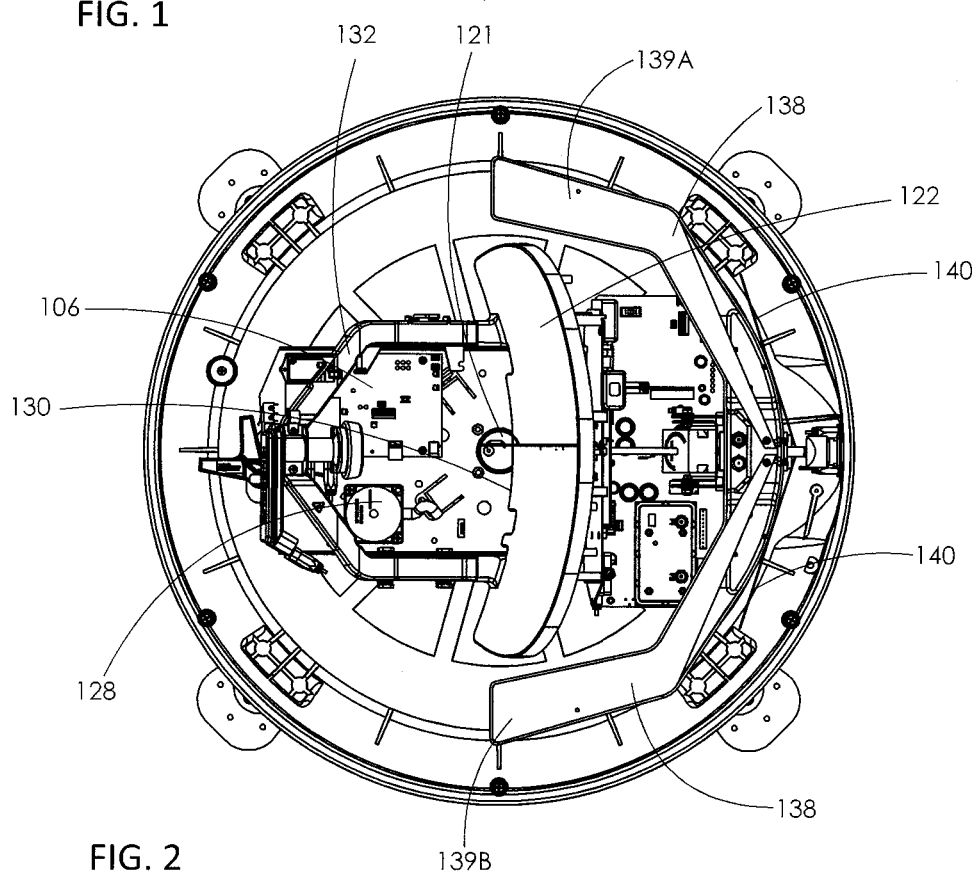
FIG. 2 is a top view of an enclosed multi-antenna system with the cover removed, according to an example embodiment.

One embodiment of a suitable VHF antenna assembly is shown in FIGS. 1-6. The VHF antenna element 138 generally resembles a fat U-shape or generally a wide V-shape. More particularly, the VHF antenna element 138 comprises mirrored right 139A and left 139B halves. The VHF antenna element is disposed on the turntable 108. Viewed in top plan view as shown in FIG. 2, each half has an electrical attachment end, a distal end and an elbow approximately half way between the respective ends. Each element 139A and 139B widen as they span from the attachment end to the distal end. As can be seen in other figures, an upwardly facing flange 141 is provided around the perimeter of the support structures to add strength or rigidity. Additional support structure may be added as necessary to maintain the elements in their intended deployed configuration during operation and transport of the system 100. Other configurations of VHF antenna elements may be used without departing from the scope of the invention. In addition, the VHF antenna element may be molded or embedded into the base or other portion of the enclosure rather than mounting on the turntable.

Figure 9:
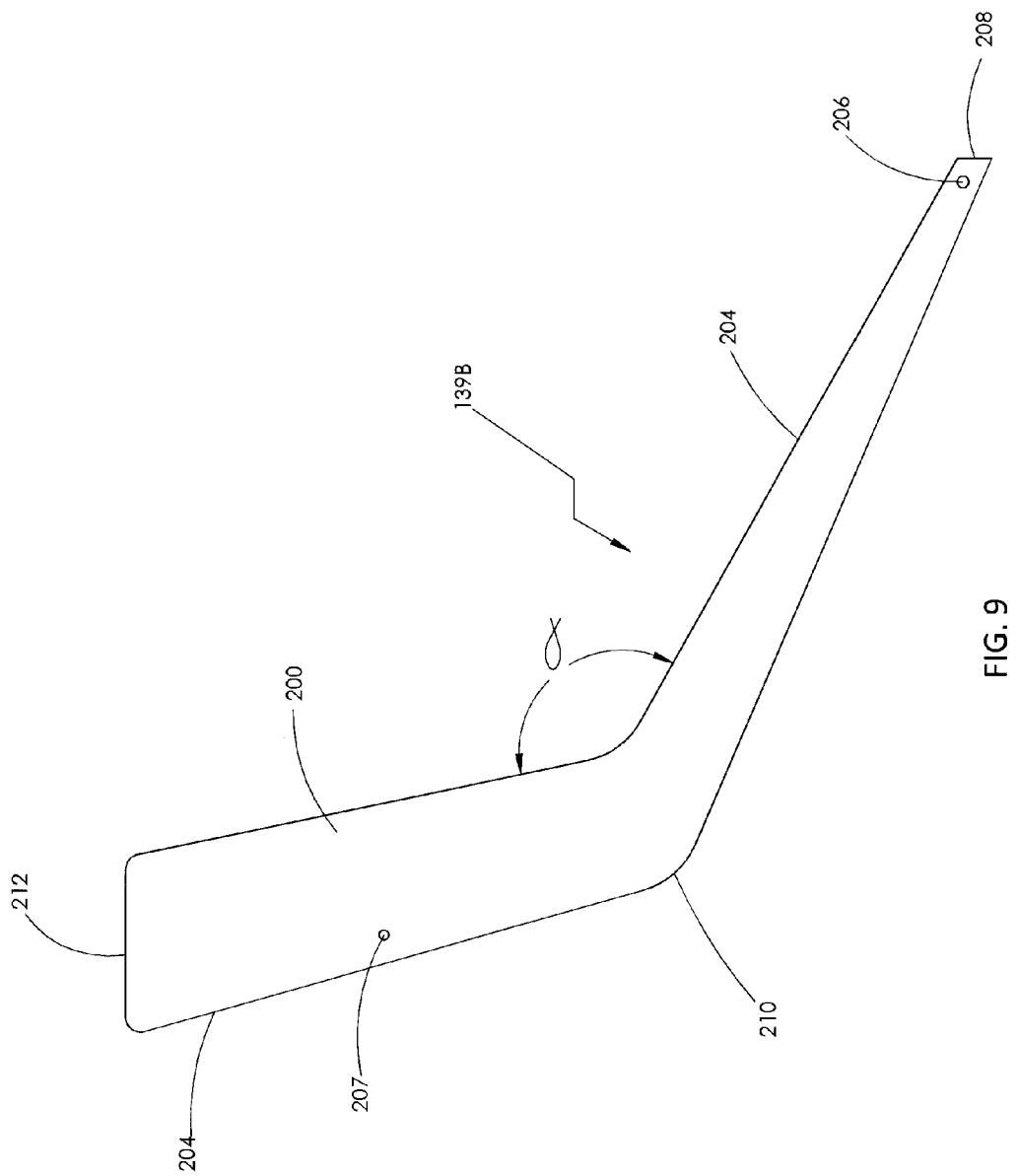
FIG. 9 is a top view of a VHF antenna element according to an example embodiment.

Referring to FIG. 9, VHF antenna element 139B is shown. The antenna element 139B includes a generally flat top surface 200, a generally flat bottom surface and a perimeter edge surface 204. An attachment aperture 206 is defined though the thickness of the element and located adjacent the proximal end 208. The aperture 206 permits the element to be fastened to the antenna assembly or other portion of the system. The width of the element in top plan view widens (edges diverge) as the element extends distally toward an elbow portion 210.

The element then continues to expand in width until reaching the distal end 212. The angle α between the portion between the proximal end 208 and the elbow 210, and the elbow 210 and the distal end 212 is greater than 90 degrees, and preferable about 130 degrees. Antenna element 139A is a mirror image of element 139B.

Figure 3:
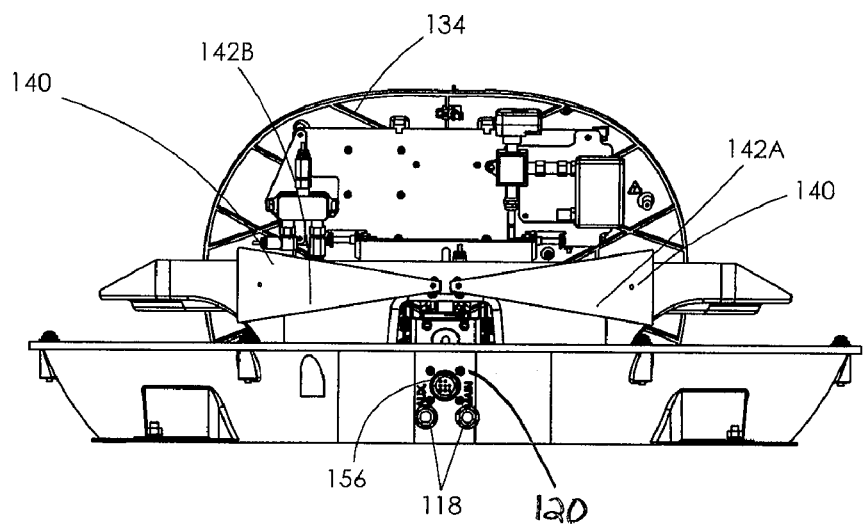
FIG. 3 is a rear view of an enclosed multi-antenna system with the cover removed, according to an example embodiment.

UHF band reception is provided by an UHF antenna assembly 140. The UHF antenna element 140 is disposed on the turntable 108. The UHF element 140 comprises right 142A and left 142B sub-elements that mirror each other as shown in FIG. 3. Each sub-element 142A and 142B has an electrical attachment end and an opposing distal end. The sides taper outwards from the attachment end to the distal end and are generally triangular shaped when the system is viewed from the rear. Other configurations of UHF antenna elements may be used without departing from the scope of the invention. In addition, the UHF antenna element may be molded or embedded into the base or other portion of the enclosure rather than mounting on the turntable.

Figure 10:
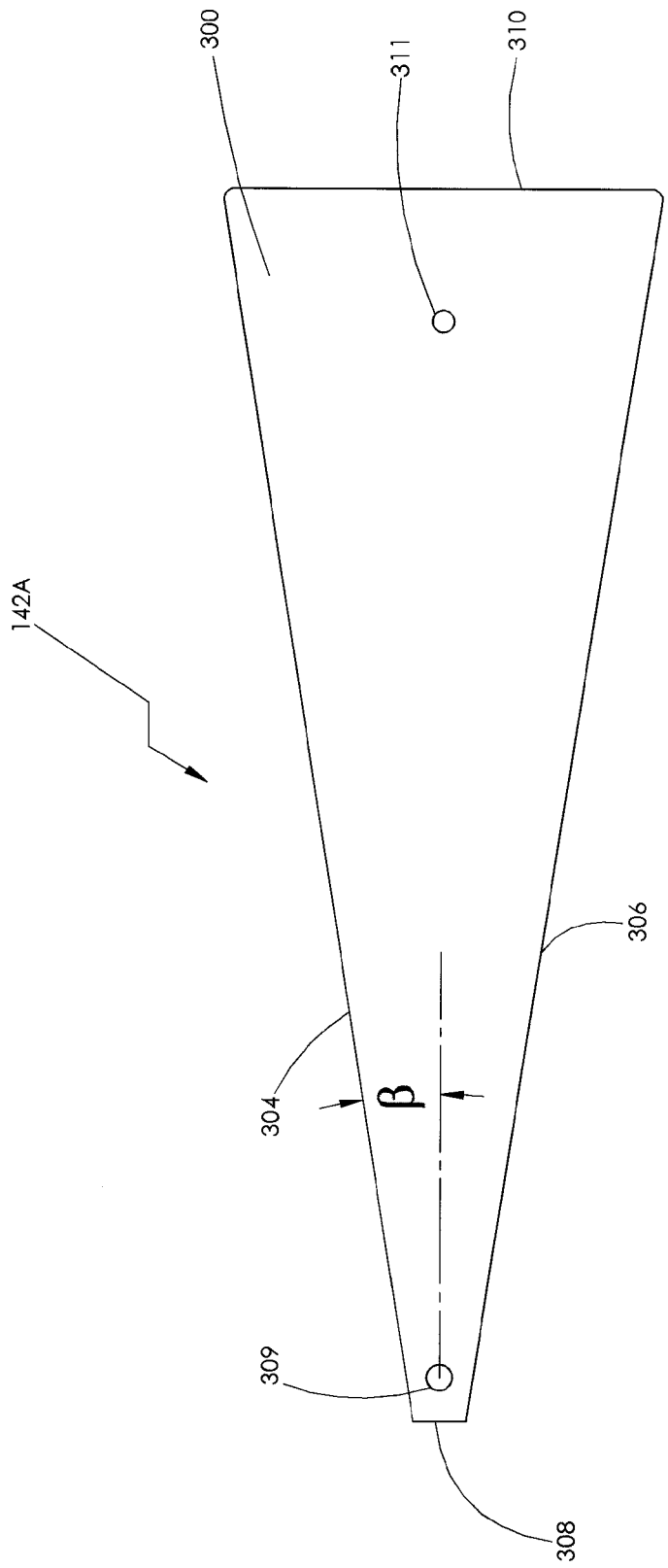
FIG. 10 is a top view of a UHF antenna element according to an example embodiment.

Referring to FIG. 10, UHF antenna element 142A is shown. The antenna element 142A includes a generally flat top surface 300, a generally flat bottom surface, a first side edge or surface 304, a second side edge or surface 306, a proximal end 308 and a distal end 310. An attachment aperture 309 is defined though the thickness of the element and located adjacent the proximal end 308. The aperture 309 permits the element to be fastened to the antenna assembly or other portion of the system. The first side 304 and second side 306 diverge as the extend from the proximal end 308 to the distal end 310. Thus, the width of the top 300 and bottom surfaces 302 increases in the direction of the distal end 310. The angle of divergence 13 of the first and second sides from the centerline is approximately 12 degrees. Antenna element 142B is a mirror image of element 142A.

Both VHF and UHF elements may comprise a metal or a non-metal material with a metal coating. The elements can have a thickness sufficient to maintain their shape during operation and transport of the system 100. One or more of the elements may be formed by forming, printing or overlaying a metallic layer, such as copper alloy or aluminum, on a flexible dielectric substrate, such as plastic. For example, the elements may comprise a Mylar core or base with a metal coating thereon, such as aluminum. The overall element thickness of this example is approximately 0.005 inches. A rigid support structure can be provided as necessary to maintain the shape of the element. The printed, formed or overlaid metal layer may be solid, mesh or cross-hatched. Material costs are saved by using a mesh or cross-hatching configuration. Also semi-see-through configurations may not block as much incoming satellite television signal as a solid configuration if part of the off-air element protrudes forward of the plane of the dish.

In one example embodiment, an enclosed multi-antenna system configured to receive both satellite and off-air television signals has the same enclosure dimensions as a conventional satellite television system. Maintaining conventional outer dimensions advantageously permits RV manufacturers to use the present invention without needing to perform costly alterations to the vehicle design or feature set. Maintaining existing outer dimensions also facilitates retroactive application to vehicles using existing mounting hardware without the need to perform costly modifications or purchase new hardware.

In another example embodiment the enclosed multi-antenna system is configured for being manually portable or hand portable. In such configurations, the weight is preferably less than 20 pounds to facilitate hand carrying. However the weight is most preferably less than 15 pounds for the same reason.

In a further example, the enclosed multi-antenna system is configured for roof mounting on a vehicle, such as an RV. In such configurations, the vertical height of the outside dimensions of the enclosure is preferably less than 15 inches, and most preferably 12.5 inches or less, in order to maximize vehicle clearance and minimize wind drag.

The off-air antenna elements 138 and 140 are generally located such that they do not block the incoming satellite signals to the dish. As shown in FIG. 2, for example, the elements are generally located behind or rearward of the plane of the satellite dish 122. As can be understood referring to FIG. 4, the generality of the location of the off-air elements is such that as the angle between the dish and the horizon becomes steeper, the vast majority of the off-air antenna elements 138 and 140 remain behind the satellite dish 122. Such placement also allows the back side of the dish 122 to function in certain configurations as a ground plane for the antenna elements 138 and 140. Alternatively, the inner surface of the base can serve as a ground plane in various configurations. Thus the cost and design complexities introduced by the need for a separate ground plane component can be avoided.

Figure 7:
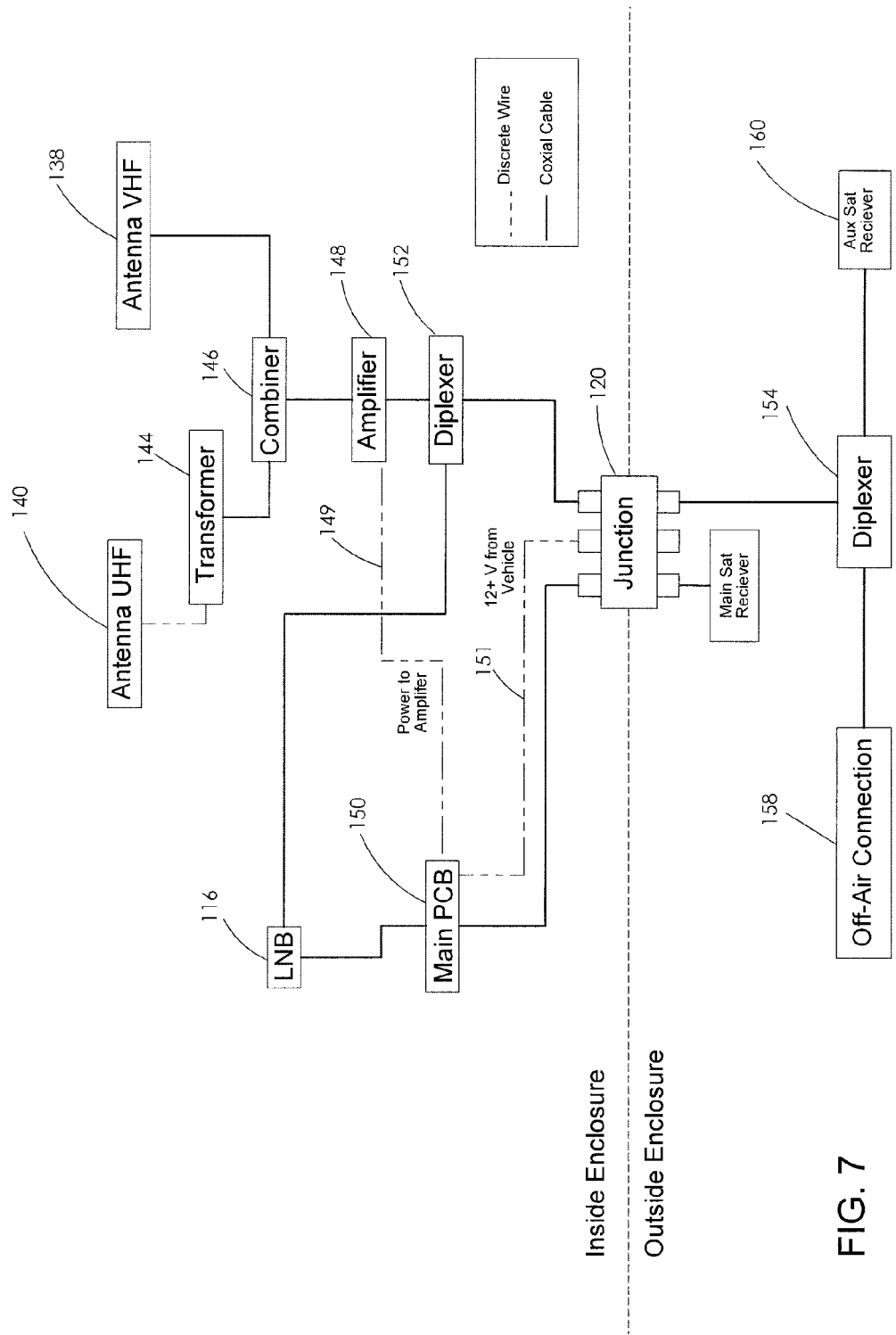
FIG. 7 is a connection diagram for an enclosed multi-antenna system according to an example embodiment.

Referring to FIG. 7, the electrical signal connectivity of various system components according to one example embodiment is shown. The UHF off-air element 140 is connected to a transformer 144 for impedance matching prior to connection to a combiner 146. The VHF off-air element 138 is also connected to the combiner 146. Then the combined VHF/UHF signal is amplified by an amplifier component 148. The amplifier component 148 is powered by a line 149 from the main circuit board 150. The incoming power line 151 to the main circuit board from an external source is also shown.

After amplification, the combined VHF/UHF off-air television signal is routed to a diplexer 152 along with the output of the satellite television signal converter or LNB 116. The diplexed satellite/off-air signals are then connected to the connectors of the enclosure junction or interface 120. External cables are then connected to the jacks or connectors or outlets provided in the interface. Another diplexer 154 is located external to the enclosure in order to separate the off-air television signals from the satellite television signals. Then each of the off-air and satellite signals are provided to a respective off-air connection 158 and an auxiliary satellite receiver connection 160.

Various electrical components may be connected to the off-air connection 158 and satellite receiver connection 160. For example, both connections 158 and 160 may be connected to an integrated receiver decoder (IRD). The IRD may also contain a diplexer, thereby eliminating the need for a separate diplexer 154 as shown in FIG. 7. The off-air connection 158 may be connected directly to a television or a discrete decoder, while the satellite connection 160 may be connected to a satellite receiver/decoder or IRD. Both connections may also be connected directly to a television having integrated IRD electronics. More than one receiver component or IRD may be connected as well. For example, a main satellite television receiver may be connected to one interface connector and a diplexer may be connected to another output. A separate power line may be provided, or power can be transmitted to the system though one of the signal output cables.

Figure 8:
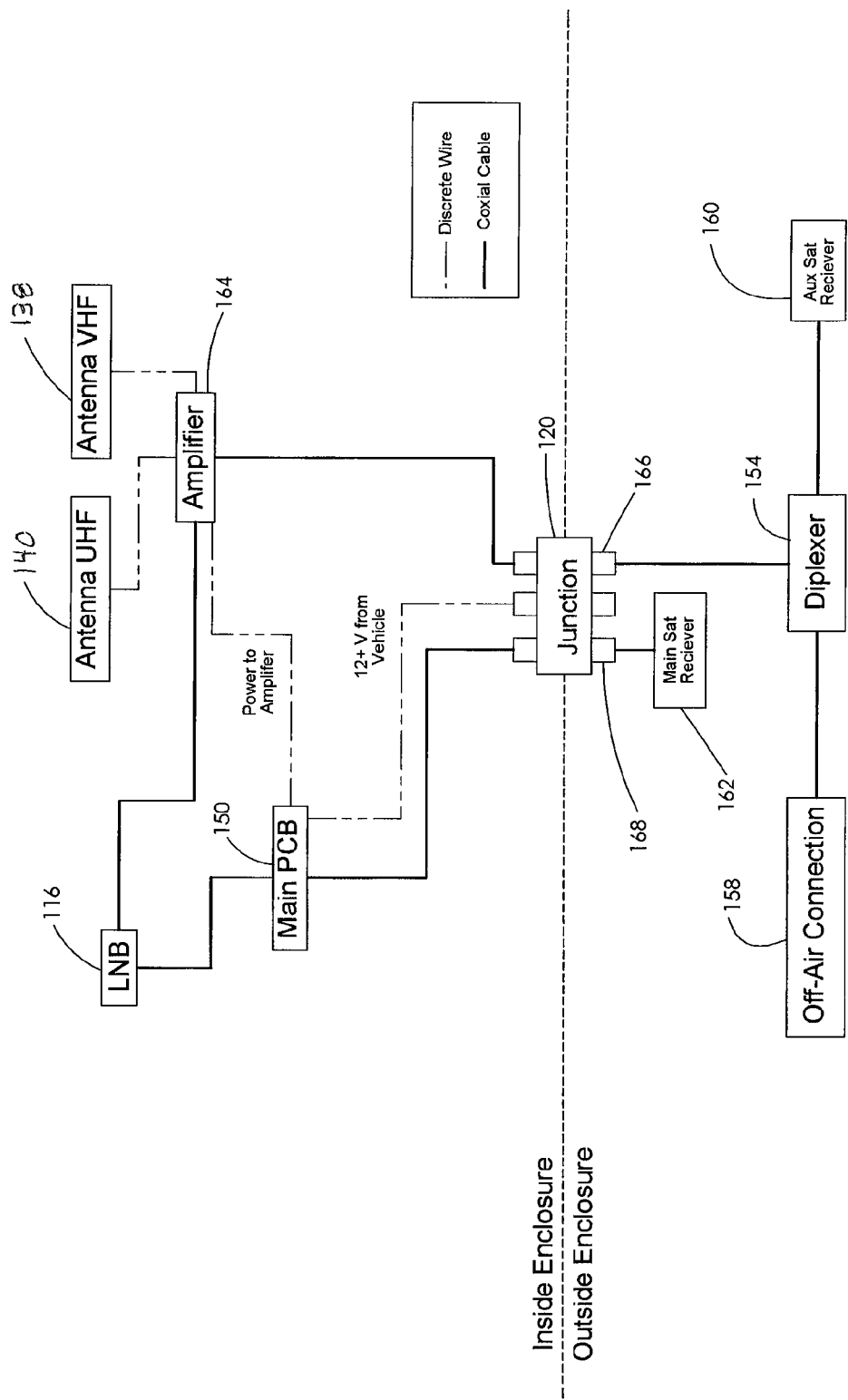
FIG. 8 is a connection diagram for an enclosed multi-antenna system according to an example embodiment.

Referring to FIG. 8, an additional alternative example embodiment of electrical signal connectivity of various system components is shown. The UHF off-air element 140 and VHF off-air antenna element 138 are both connected to an amplifier board 164. The output of the LNB 116 is also contacted to the amplifier board 164. The amplifier board 164 is a circuit board configured to integrate the combiner, transformer, amplifier and diplexer functions of the separate components discussed with respect to FIG. 7. Thus, the amplifier board transforms the UHF signal, combines the VHF signal with the transformed UHF signal, amplifies the combined UHF/VHF signal and diplexes the combined UHF/VHF signal with the satellite signal from the LNB. The amplifier board 164 may be powered by a power line connected to the main circuit board 150. By using an integrated circuit board instead of separate components, there is a reduction in component cost, weight is reduced, assembly is faster and space consumed by mounting multiple components is saved.

Referring to FIGS. 7-8, the output of the amplifier board 164 is connected to the junction 120 and exits the system 100 via an auxiliary output 166. The signal from the LNB 116 is also connected to the main circuit board 150, which is then connected to the junction 120 and exits the system 100 via main output 168. A main satellite receiver/decoder 162 may be connected to the main output 168. This receiver 162 does not receive the off-air signals, so that main circuit board 150 is not exposed to the off air television signals, which might interfere with performance of the main circuit board 150. Alternatively signal filters could be added to a diplexed line between the main satellite receiver 162 and the main circuit board 150 to suppress the added off-air television signals. The diplexed signal at the auxiliary output 166 is connected to a diplexer 154 and can then be connected to various components as described with regard to FIG. 7, for example, a satellite receiver or IRD 160.

Alternatively the diplexed signal (or separate off-air and satellite signals) can be wirelessly transmitted from a transmitter contained within or outside of the enclosure, using Bluetooth for example, to a corresponding receiver connected to an IRD. The interface 120 may also include an external antenna input that permits external antenna signals to be combined with the signals received from the antenna assemblies inside the enclosure.

A main power line connector 156 is also provided to the interface 120 when the antenna system 100 is to be powered by a separate power line. Alternatively, the antenna system 100 may be powered by drawing power off of the external signal line connecting the IRD to the interface 120. A further alternative power means includes providing one or more solar cells to the outer surface of the dome or the base and providing an energy storage device, such as a rechargeable battery, inside of the enclosure. The system components can then be electrical connected to the energy storage device so that power can be drawn as needed.

In operation, the main control board 150 can selectively actuate the azimuth motor and the tilt motor as needed to find and lock onto a television signal being broadcast from a particular location (both terrestrial and orbital). For example, a user operates a remote control to input a particular television channel selection in the IRD. That channel input command is relayed to the logic contained in the main circuit board of the antenna system, which then aims or moves the antenna components to a position where the strongest reception occurs corresponding to the broadcast of the user's desired channel.

If the desired channel is broadcast from an off-air, terrestrial or earth based transmitter, the main circuit board can be configured to automatically locate and lock onto the corresponding signal source by causing the azimuth motor to rotate the turntable until the strongest signal corresponding the user-selected channel is found. Such automatic operation can be facilitated, for example, by inclusion of a radio frequency sensing circuit in the enclosure that provides radio frequency strength information to the electronics controlling rotation fo the turntable.

Once the desired off-air channel is located and peaked, the location or position is then stored in the antenna system's memory for possible later recall, permitting expedited rotation to the correct location because searching does not need to be performed again. Then, if the user changes to a different off-air channel, the main circuit board again commands the azimuth motor to rotate until the strongest signal corresponding to the new user-selected channel is found. That location is also stored in memory. The system can then quickly jump between positions stored in memory.

The satellite antenna dish can also automatically be moved to an optimal position when an off-air channel is indicated. The optimal position is the one that will provide the strongest signal reception by the off-air antenna elements. For example, in the embodiments shown in FIGS. 1-6, the dish would be moved to be as close as possible to parallel the vertical plane. In doing this, the back side of the dish can contribute to off-air reception by functioning as a ground plane for the off-air antenna elements.

If the user switches from an off-air station to a station broadcast from a satellite in orbit, the main circuit board will operate both the azimuth and tilt motors to point the dish at the corresponding satellite location or position in the sky corresponding to the user-selected channel. The corresponding tilt and azimuth locations corresponding to the particular satellite location is then stored in memory. The stored positions allow the antenna system to jump between two or more differently located broadcast sources, including between off-air and satellite broadcasts.

The operation of the antenna system can be semi-automatic, meaning that a user may control the operation of the turntable and/or the tilt functions through the use of a remote control. The operation may also be fully automated, meaning that the logic programmed into the main circuit board controls all of the aiming functions of the device; the user need only operate the IRD or television. In addition, the antenna system may also include motion sensors and corresponding logic, thereby permitting operation while the vehicle on which the system is mounted is in motion.

In one example embodiment, when the antenna system powers on, the angle and azimuth motors are actuated as necessary to find the channel currently requested by the IRD. Alternatively, the system may first return to a previous orientation or aim at the broadcast source required to receive the last station viewed by a user. In further alternatives, the system may run a diagnostic routine, perform an orientation check or aim at a default location such as the strongest off-air signal.

The operation of the antenna system can further be a combination of automatic and semi-automatic. For example, the operation of the satellite antenna can be automatic, while the operation of the off-air antenna elements can be semi-automatic. In such configuration, when the system is locked onto a satellite broadcast position and the user selects an off-air television channel, the user operates a remote control to turn the turntable until the desired off-air channel can be viewed. Viewing a signal strength meter on the user's television can aid a user in finding the rotational position corresponding to the strongest signal for the desired channel. The system may store the user-located position for later quick recall. If the user is viewing an off-air television channel and then selects a channel corresponding to a satellite television broadcast, then the satellite antenna can be automatically operated to move to the satellite position corresponding to that channel. Such movement may be based upon a position recall from memory or by performing a search.

The motion sensors or a tilt sensor can be used as a theft alarm system that is activated if movement of the antenna system 100 exceeds a preselected threshold, for example, if an acceleration exceeding a preset magnitude value is exceeded or a particular direction is sensed.

While the invention has been described in connection with what is presently considered to be the most practical and preferred example embodiments, it will be apparent to those of ordinary skill in the art that the invention is not to be limited to the disclosed example embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. An enclosed antenna system comprising:
an enclosure having an exterior surface;
a motorized turntable disposed within the enclosure;
a main circuit board disposed within the enclosure configured to control operation of the motorized turntable;
a satellite television antenna, including a reflector dish, disposed within the enclosure and coupled to the turntable; and
a UHF antenna element disposed within the enclosure, located behind the reflector dish, above the turntable and coupled to the turntable such that the UHF antenna assembly rotates as the turntable rotates; and
a VHF antenna element disposed within the enclosure, located above the turntable, generally behind the reflector dish and coupled to the turntable such that the VHF antenna assembly rotates as the turntable rotates.

2. The enclosed antenna system of claim 1, further comprising an amplifier board disposed within the enclosure and electrically connected to the satellite television antenna assembly, the UHF antenna element and the VHF antenna element.

3. The enclosed antenna system of claim 2, wherein the amplifier board is configured to amplify and diplex the broadcast signals received by the satellite television antenna assembly, the UHF antenna element and the VHF antenna element.

4. The enclosed antenna system of claim 2, wherein the amplifier board is powered through an electrical power connection to the main circuit board.

5. The enclosed antenna system of claim 2, wherein the amplifier board is electrically connected to the UHF antenna element and the VHF antenna element and to an auxiliary output in a junction located on the exterior of the enclosure.

6. The enclosed antenna system of claim 1, wherein the reflector dish is pivotally mounted to the turntable, and the further comprising an elevation control motor operably connected to the dish and to adjust the elevational aim of the dish with respect to the horizon.

7. The enclosed antenna system of claim 1, further comprising a handle provided to the exterior surface of the enclosure.

8. The enclosed antenna system of claim 1, wherein the exterior surface of the enclosure defines a vertical height of less than 15 inches.

9. An enclosed antenna system comprising:
an enclosure having an exterior surface;
a motorized turntable disposed within the enclosure;
a satellite television antenna assembly disposed within the enclosure and pivotally mounted to the turntable, the satellite television antenna assembly comprising a satellite dish and a signal converter disposed within the enclosure;
a VHF antenna element and an UHF antenna element, each disposed within the enclosure and mounted so that the VHF antenna element and UHF antenna element rotate with the rotation of the turntable;
an elevation motor coupled to the satellite dish and configured to adjust an elevation angle of the dish with respect to the horizon; and
a main circuit board disposed within the enclosure configured to control operation of the motorized turntable,
wherein the UHF antenna element is located behind the satellite dish and comprises mirrored right and left halves, each of the right and left halves defining a first end that is electrically attached and a second end opposite the first end, each of the first and second ends defining a respective width, the width of the first end being smaller than the width of the second end.

10. The enclosed antenna system of claim 9, further comprising an amplifier board electrically coupled to the VHF antenna element and the UHF antenna element, the amplifier board configured to combine and amplify off-air television signals received by the VHF antenna element and the UHF antenna element.

11. The enclosed antenna system of claim 10, wherein the amplifier board is further electrically coupled to the satellite antenna assembly and is configured to diplex signals from the satellite television antenna assembly and the UHF and VHF antenna elements.

12. A method of watching television broadcasts from satellite and off-air sources using a multi-antenna system contained within a single enclosure, the method comprising:
providing an enclosure having a satellite antenna assembly, including a reflector dish, and an off-air antenna assembly disposed therein, the off-air antenna assembly being located generally behind the reflector dish, the off-air antenna assembly including separate VHF and UHF antenna elements, the enclosure defining a vertical height of less than 15 inches;
selecting a television channel on a receiver located external to the enclosure corresponding to a satellite television broadcast;
rotating the azimuth and changing the elevation angle of the satellite antenna assembly to correspond to the broadcast source of the satellite television broadcast;
selecting a television channel on the receiver corresponding to an off-air television broadcast; and
rotating the azimuth of the satellite antenna assembly to aim the off-air antenna assembly to correspond to the broadcast source of the off-air television broadcast.

13. The method of claim 12, further comprising:
diplexing the satellite television signal received from the satellite antenna assembly with the off-air television signal received by the satellite antenna assembly.

14. The method of claim 13, further comprising:
reverse diplexing the diplexed satellite and off-air television signal.

15. The enclosed antenna system of claim 9, wherein each of the right and left halves of the UHF antenna element further define opposing edges spanning between the first end and the second end, the opposing edges diverging as they extend from the first end to the second end.

16. The enclosed antenna system of claim 15, wherein the angle of divergence of the first and second sides from the centerline is approximately 12 degrees.

17. The enclosed antenna system of claim 9, wherein each of the right and left halves of the UHF antenna element define a generally planar surface.

18. The enclosed antenna system of claim 9, wherein the VHF antenna element comprises mirrored right and left halves, each of the right and left halves defining a first end that is electrically attached and a second end opposite the first end, each of the first and second ends defining a respective width, the width of the first end being smaller than the width of the second end.

19. The enclosed antenna system of claim 18, wherein each of the right and left halves of the VHF antenna element further define an elbow at the approximate midpoint between the first end and the second end.

20. The enclosed antenna system of claim 18, wherein each of the right and left halves of the VHF antenna element include an upwardly extending flange.

* * * * *